United States Patent
Chen et al.

(10) Patent No.: US 9,859,565 B2
(45) Date of Patent: Jan. 2, 2018

(54) ULTRAFAST RELIABLE SILICON ENABLED BATTERY AND ASSOCIATED METHODS

(71) Applicants: Zhaohui Chen, San Jose, CA (US); Yang Liu, Santa Clara, CA (US); Charles W. Holzwarth, San Jose, CA (US); Nicolas Cirigliano, Burlingame, CA (US); Bum Ki Moon, Gilroy, CA (US)

(72) Inventors: Zhaohui Chen, San Jose, CA (US); Yang Liu, Santa Clara, CA (US); Charles W. Holzwarth, San Jose, CA (US); Nicolas Cirigliano, Burlingame, CA (US); Bum Ki Moon, Gilroy, CA (US)

(73) Assignee: INTEL CORPORATION, Santa Clara, CA (US)

( * ) Notice: Subject to any disclaimer, the term of this patent is extended or adjusted under 35 U.S.C. 154(b) by 897 days.

(21) Appl. No.: 13/931,539

(22) Filed: Jun. 28, 2013

(65) Prior Publication Data
US 2015/0004471 A1    Jan. 1, 2015

(51) Int. Cl.
*H01M 4/70* (2006.01)
*H01M 4/78* (2006.01)
*H01M 10/24* (2006.01)
*H01M 4/66* (2006.01)
*H01M 4/48* (2010.01)
*H01M 4/24* (2006.01)
*H01M 4/38* (2006.01)
(Continued)

(52) U.S. Cl.
CPC .............. *H01M 4/66* (2013.01); *H01M 4/24* (2013.01); *H01M 4/38* (2013.01); *H01M 4/48* (2013.01); *H01M 4/5815* (2013.01); *H01M 10/0436* (2013.01); *H01M 10/287* (2013.01); *H01M 4/661* (2013.01); *H01M 4/667* (2013.01); *H01M 4/78* (2013.01); *H01M 6/40* (2013.01); *H01M 2300/0014* (2013.01); *Y10T 29/49115* (2015.01)

(58) Field of Classification Search
CPC ........ H01M 4/64; H01M 4/244–4/248; H01M 4/66; H01M 4/36; H01M 4/382; H01M 4/48; H01M 10/04
USPC ................................. 429/121–347; 29/623.5
See application file for complete search history.

(56) References Cited

U.S. PATENT DOCUMENTS 3,982,960 A * 9/1976 Hoekje et al. ................. 429/199
7,695,855 B2 * 4/2010 Sunagawa et al. ........... 429/128
(Continued)

OTHER PUBLICATIONS

Wang, Hailiang et al.; An ultrafast nickel-iron battery from strongly coupled inorganic nanoparticle/nanocarbon hybrid materials; Nature Communications; Jun. 26, 2012; pp. 1-8.

*Primary Examiner* — James Lee
(74) *Attorney, Agent, or Firm* — Thorpe North & Western, LLP; David W. Osborne

(57) ABSTRACT

Ultrafast battery devices having enhanced reliability and power density are provided. Such batteries can include a cathode including a first silicon substrate having a cathode structured surface, an anode including a second silicon substrate having an anode structured surface positioned adjacent to the cathode such that the cathode structured surface faces the anode structured surface, and an electrolyte disposed between the cathode and the anode. The anode structured surface can be coated with an anodic active material and the cathode structured surface can be coated with a cathodic active material.

17 Claims, 3 Drawing Sheets

(51) Int. Cl.
*H01M 4/58* (2010.01)
*H01M 10/04* (2006.01)
*H01M 10/28* (2006.01)
*H01M 6/40* (2006.01)

(56) References Cited

U.S. PATENT DOCUMENTS

| | | |
|---|---|---|
| 2002/0132169 A1* | 9/2002 | Yamamoto et al. .......... 429/317 |
| 2007/0015061 A1* | 1/2007 | Klaassen ................ H01M 4/13 429/322 |
| 2007/0111096 A1* | 5/2007 | Kobayashi .............. C22C 18/00 429/229 |
| 2010/0099031 A1* | 4/2010 | Kato ................... H01M 10/052 429/330 |
| 2010/0167118 A1* | 7/2010 | Liu .................... H01M 4/0435 429/163 |
| 2012/0121983 A1* | 5/2012 | Yoon ................... H01M 4/661 429/220 |

* cited by examiner

ULTRAFAST RELIABLE SILICON ENABLED BATTERY AND ASSOCIATED METHODS

TECHNICAL FIELD

Embodiments described herein relate generally to energy storage devices.

BACKGROUND

Energy storage devices, including batteries and capacitors, are often used in various electronic devices. Batteries, for example, have a wide range of uses, particularly those capable of recharging. One type of rechargeable battery includes Li ion batteries that are used in mobile electronics due to the high energy density and efficiency of these devices. However, Li ion batteries are not suitable for energy storage systems where high power or fast charging/discharging capabilities are desirable. In addition, Li ion batteries have other disadvantages such as high cost, low cycling life, and various safety issues affecting the potential future of this type of battery for electrical vehicles, grid scale storage, and other related applications.

DESCRIPTION OF EMBODIMENTS

Figure 1:
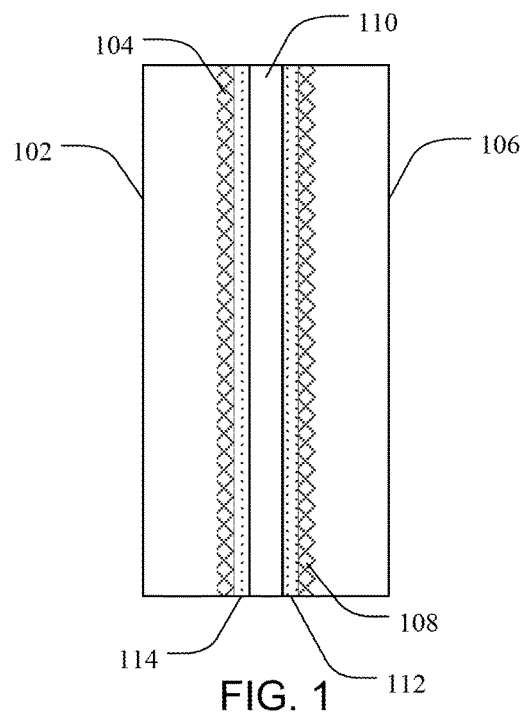
FIG. 1 is a schematic view of a section of a battery device in accordance with an invention embodiment.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

It is thus provided an ultrafast and reliable silicon enabled battery that utilizes conventional cathode/anode systems such as, for example, Ni—Fe systems. These batteries utilize silicon substrates having nano/micro structured surfaces to increase the surface area between the active material and the electrolyte. As such, the power density can be improved and a reasonable energy density can be maintained. Also, the increased surface area can increase power performance and cycle life simultaneously due to the greater interaction between the surface of the electrode and the electrolyte and/or reduced ion migration into and out of the electrode during charge/discharge events. In one aspect, for example, such a system can achieve about a 1,000-fold power density increase over traditional Ni—Fe batteries while attaining high energy density. As one specific example, an ultrafast Ni—Fe battery can be charged in ~2 min and discharged within 30 seconds to deliver a specific energy of about 120 Wh kg-1 and a specific power of 15 kW kg-1. As is also discussed more fully below, a silicon enabled battery can be integrated into electronic systems on the die level. This can be a useful technology for micro electronic systems requiring miniaturized high power energy storage devices.

In one aspect, as is shown in FIG. 1 for example, an ultrafast battery device having enhanced reliability can include a cathode including a first silicon substrate 102 having a cathode structured surface 104 and an anode including a second silicon substrate 106 having an anode structured surface 108 positioned adjacent to the cathode such that the cathode structured surface 104 faces the anode structured surface 108. The device can also include an electrolyte 110 disposed between the cathode and the anode. Additionally, in some aspects the anode structured surface 108 can be coated with an anodic active material 112 and the cathode structured surface 104 can be coated with a cathodic active material 114. It is additionally contemplated that active material can be coated on either the cathode structured surface or the anode structured surface.

Figure 2:
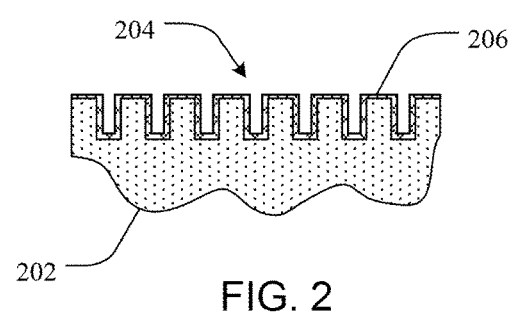
FIG. 2 is a schematic view of a section of a structured surface of a silicon substrate in accordance with another invention embodiment.

FIG. 2 shows a close up section of a silicon substrate 202 having a structured surface 204. An active material 206 is coated onto the structured surface 204 of the silicon substrate 202.

The silicon substrate materials utilized in constructing the anode and/or the cathode can be any type of silicon or composite silicon material capable of being used in a battery device. For example, the silicon can be monocrystalline, polycrystalline, amorphous, porous, and the like. Additionally, the silicon material can be doped or undoped depending on the design of the device. Doping can be utilized to alter various properties of the silicon material, including electrical and mechanical properties.

In some high power aspects where heat management may become an issue, a structured silicon surface can be used as a template, and the silicon can act as a sacrificial layer to form a structured surface of a metal material having good thermally conductive properties. Such a metal surface thus has a high surface area for subsequent electrode fabrication.

A "structured surface" refers to any surface modification that increases the surface area of the material upon which such a modification is performed. In some aspects, a silicon substrate having a structured surface can have a much higher surface area as compared to a substrate lacking such surface structuring. It is noted that any type of structuring to any degree that increases the surface area of the silicon substrate is considered to be within the present scope. In some cases, a structured surface can be comprised of distinct surface features that increase the surface area of the material. While such surface features can be of any size that is beneficial for use in a battery device, in one aspect surface features can have an average size of from about 10 nm to about 100 microns. In another aspect, surface features can have an average size of from about 10 nm to about 300 nm. In yet another aspect, surface features can have an average size of from about 10 nm to about 80 nm. Non-limiting examples of surface feature types can include pillars, tubes, trenches, cones, pyramids, walls, pores, sponges, wires, and the like, including appropriate combinations thereof. It is noted that the measurement of average size of a given surface feature can vary depending on the feature. For example, vertically oriented surface features such as pillars, tubes, cones, and pyramids can be measured from the base to pinnacle of the feature. For pores, on the other hand, average size can be measured as an average diameter of the pore, while trenches can be measured as the trench width or pitch.

A silicon substrate having a structured surface with a high surface area can be utilized as a support scaffold as well as a current collector for battery electrodes. Structured surfaces, along with surface features, can be formed by any known method, and any such method is considered to be within the present scope. Naturally, the type of surface being formed may dictate the technique utilized to form such a material. In some aspects, for example, surface structure can be formed via the anodization, MEMS processing which include: lithography, chemical etching, and the like, as well as other known methods. Additionally, by varying the three dimensional characteristics of the structured surface, as well as the thickness of the active material, the resulting device can be optimized to achieve higher energy capacity or higher power density.

The choice of materials in the design of a battery can vary greatly depending on the desired parameters of the resulting device. With respect to active materials used as electrode coatings, for example, any combination of materials capable of use as anode/cathode materials for a battery device are considered to be within the present scope. It is noted that many active materials are known, and are commonly used in battery, capacitor, and other electrical storage systems, all of which are considered to be within the present scope. Non-limiting examples of active materials can include Ni, Fe, Cd, Zn, Ag, Li, Mg, including oxides, sulfides, and appropriate combinations thereof. More specifically, non-limiting examples of anodic active materials can include Fe, Cd, Zn, including oxides, sulfides, and appropriate combinations thereof. Non-limiting examples of cathodic active material can include Ni, Ag, Li, Mg, including oxides, sulfides, and appropriate combinations thereof. It is noted, however, that the presence of an active material in a list for a given electrode type does not preclude the use of that active material as an active material for the opposite electrode. For example, in some cases Li and/or Li containing compounds, alloys, or mixtures can be used both the anode and cathode. Furthermore, the selection of active materials and electrolytes can depend on the desired power, energy, and voltage performance characteristics of the resulting device. That being said, non-limiting examples of cathodic/anodic active materials can include Ni/Fe, Ni/Cd, Ni/Zn, Ag/Zn, Metal/Air batteries, relevant oxides, sulphides, and the like.

In some aspects, an intermediate layer can be applied to the structured surface prior to depositing the active material thereupon in order to, among other things, improve the adhesion between the active material and the silicon. The intermediate layer can also reduce diffusion during heat treatment, as well as stabilizing the interface between these materials. In addition, it is contemplated that multiple intermediate layers can be disposed between the active material and the silicon. Any intermediate material that provides a useful benefit when disposed between these layers is considered to be within the present scope. Non-limiting examples of such intermediate materials can include Cr, Ti, Au, Pt, as well as relevant other oxides and sulphides thereof. Additionally, the intermediate layer can be disposed between the first silicon substrate and the anodic active material, the second silicon substrate and the cathodic active material, or between the first silicon substrate and the anodic active material and between the second silicon substrate and the cathodic active material.

The various materials described herein can be deposited and/or formed by any known technique, and the present scope should not be limited by such processes. For example, active, intermediate, or other materials can be deposited by a variety of non-limiting methods, including CVD, PVD, ALD growth, supercritical flow growth hydrothermal growth, and the like. Such could also be used or combined in use for coating desired complex active materials (e.g. Li cathodes) onto structured silicon surfaces. In some cases, post annealing can be performed to enhance the coating quality.

As has been described, in many cases oxide materials can be particularly useful as active materials in various aspects. As one non-limiting example, a precursor material such as Ni or Fe can be applied to the structured surface of the silicon substrate. Such materials can then be chemically modified into NiOOH or FeOx respectively. In yet another aspect, starting materials such as powders including at least one of, for example, Ni, Fe, Cd, Zn, Ag, Li, or associated oxides or sulfides can be deposited onto structured silicon by solution casting, electrophoresis, or other suitable techniques, followed by sintering, converting, and annealing to form the active material coating.

In some cases it can be beneficial to modify the properties of the active material. For example, in one aspect an additive can be added to the active material. For the cathode, a cathode stability additive can be incorporated into the cathodic active material. While the cathode stability additive can be any additive that generates a beneficial effect in the cathodic active material, non-limiting examples can include Co, Ba, or the like, including a combination thereof. For the anode, an anode stability additive can be incorporated into the anodic active material. While the anode stability material can be any additive that generates a beneficial effect in the anodic active material, non-limiting examples can include Cu, S, or the like, including combinations thereof.

Numerous suitable electrolytes are known, and any such electrolyte capable of use in a battery with the present anode and cathode devices is considered to be within the present scope. The electrolyte in general needs high ionic conductivity to lower the equivalent series resistance (ESR). In some aspects, electrolytes can be aqueous based electrolytes (e.g., KOH based) with high ionic conductivity. However, one can also use either aqueous, organic, ionic liquid, or even solid electrolyte based approach or use a co-solvent approach to optimize the overall device performances. Non-limiting examples of electrolytes can include KOH, NaOH, and a combination thereof. Furthermore, in some aspects the electrolyte can also include Li ions. LiOH, for example, can be used as electrolyte additive, thus improving the stability of the battery and reducing battery self-discharge.

Figure 3:
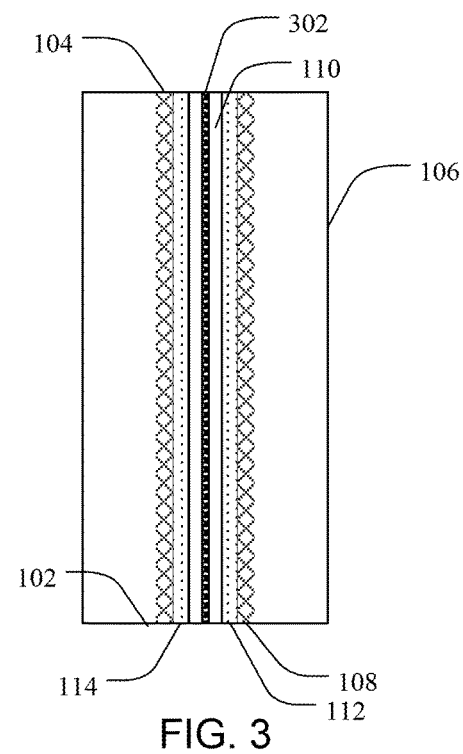
FIG. 3 is a schematic view of a section of a battery device in accordance with another invention embodiment.

It can be beneficial in some aspects to include a separator disposed between the cathode and the anode. The separator electronically separates or isolates the cathode from the anode and allows ions of the electrolyte to pass therethrough. As is shown in FIG. 3, for example, a separator 302 is positioned between the anodic active material 112 and the cathodic active material 114 and is surrounded by electrolyte 110. Exemplary separator materials may include without limitation, cellulose, including wet-laid cellulose, polymers, including non-woven polymers, microporous membranes, including ePTFE or HDPE, etc. It is noted that reference number utilized from a previous figure are considered to be the same or similar enough to the previous figure that the previous description applies.

A variety of related devices and systems are additionally contemplated, and it should be understood that any such system or device incorporating an electrode or battery device as taught herein is considered to be within the present scope. For example, in one aspect and an ultrafast battery system having enhanced reliability is provided. Such a system can include a plurality of ultrafast battery devices as has been taught, that are functionally coupled together in series or in parallel.

Figure 4:
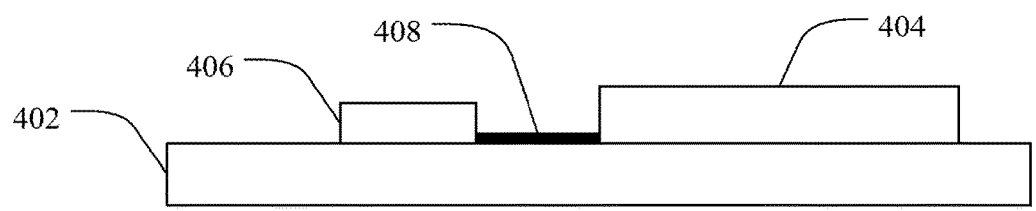
FIG. 4 is a schematic view of a monolithic device including a battery in accordance with yet another invention embodiment.

In another aspect, the present battery devices can be integrated monolithically onto a silicon substrate or package. As is shown in FIG. 4, for example, an electronic device substrate having a monolithically integrated ultrafast battery can include a semiconductor substrate 402, at least one electronic circuit element 404, and at least one ultrafast battery device 406. The electronic circuit element 404 and the ultrafast battery device 406 are thus formed monolithically on the semiconductor substrate 402. The electronic circuit element can include any type of circuit element that can be beneficially combined with a battery on a substrate. Non-limiting examples include CPUs, GPUs, integrated circuits, transistor elements, diodes, photodiodes, and the like. Additionally, the monolithic substrate can additionally include electrical circuitry 408 that provides electrical connectivity (i.e. for a control circuit) between the battery device 406 and the electronic circuit element 404.

Figure 5A:
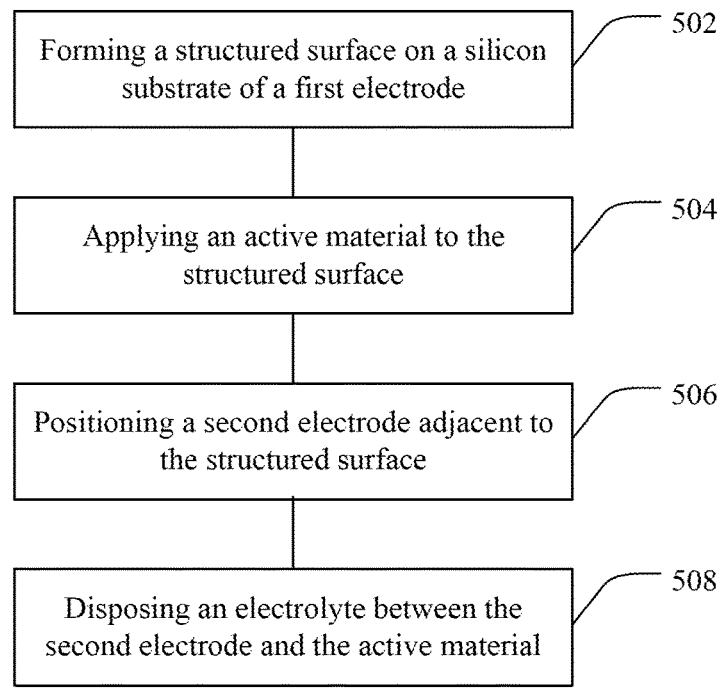
FIG. 5A is a flow diagram of a method of increasing operation speed and reliability of a battery in accordance with one invention embodiment.
Figure 5B:
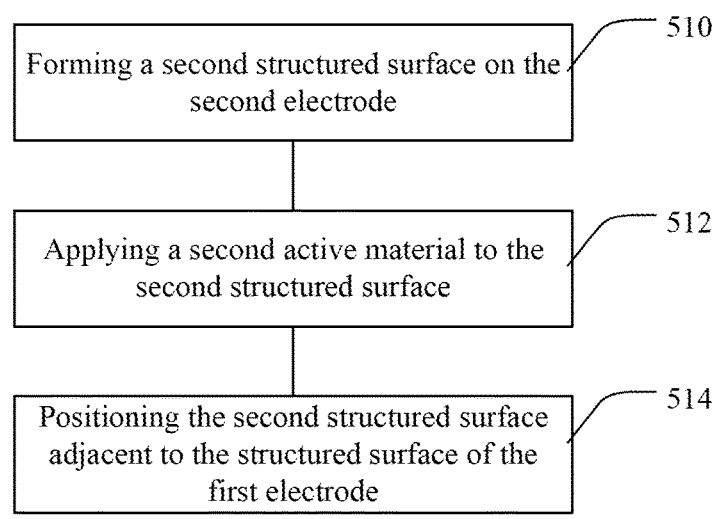
FIG. 5B is a flow diagram of a method of increasing operation speed and reliability of a battery in accordance with one invention embodiment.

The present disclosure additionally provides methods associated with the present battery devices. For example, in one aspect, as is shown in FIG. 5A, a method of increasing operation speed and reliability of a battery can include 502 forming a structured surface on a silicon substrate of a first electrode, 504 applying an active material to the structured surface, 506 positioning a second electrode adjacent to the structured surface, and 508 disposing an electrolyte between the second electrode and the active material. As is shown in FIG. 5B, the method can further include 510 forming a second structured surface on the second electrode, 512 applying a second active material to the second structured surface, and 514 positioning the second structured surface adjacent to the structured surface of the first electrode.

In one example, an ultrafast battery device having enhanced reliability may include a cathode including a first silicon substrate having a cathode structured surface, an anode including a second silicon substrate having an anode structured surface positioned adjacent to the cathode such that the cathode structured surface faces the anode structured surface, and an electrolyte disposed between the cathode and the anode. The anode structured surface can be coated with an anodic active material and the cathode structured surface can be coated with a cathodic active material.

In one example, a separator can be disposed between the cathode and the anode to electronically separate the cathode from the anode and to allow ions of the electrolyte to pass therethrough.

In one example, either of the anodic or the cathodic active material includes a member selected from the group consisting of Ni, Fe, Cd, Zn, Ag, Li, Mg, sulfides, oxides and combinations thereof.

In one example, the anodic active material includes a member selected from the group consisting of Fe, Cd, Zn, and oxides and combinations thereof.

In one example, an anode stability additive is incorporated into the anodic active material.

In one example, the anode stability additive includes a material selected from the group consisting of Cu, S, and combinations thereof.

In one example, the cathodic active material includes a member selected from the group consisting of Ni, Ag, Li, Mg, sulfides, oxides and combinations thereof.

In one example, a cathode stability additive is incorporated into the cathodic active material.

In one example, the cathode stability additive includes a material selected from the group consisting of Co, Ba, and combinations thereof.

In one example, the electrolyte includes a member selected from the group consisting of KOH, NaOH, and a combination thereof.

In one example, electrolyte further includes Li ions.

In one example, at least one of the anode structured surface or the cathode structured surface has surface features with an average size ranging from about 10 nm to about 100 microns.

In one example, the surface features include a member selected from the group consisting of pillars, tubes, trenches, cones, pyramids, walls, pores, sponges, wires and combinations thereof.

In one example, an intermediate layer is disposed between at least one of the first silicon substrate and the anodic active material or the second silicon substrate and the cathodic active material.

In one example, the intermediate layer includes a member selected from the group consisting of Cr, Ti, Au, Pt, and oxides and combinations thereof.

In one example, an electrode for an ultrafast battery device having enhanced reliability can include a silicon substrate having a structured surface coated with an active material, wherein the structured surface includes surface features having an average size ranging from about 10 nm to about 100 microns.

In one example, the electrode is configured as an anode and wherein the active material includes a member selected from the group consisting of Fe, Cd, Zn, sulfides, oxides and combinations thereof.

In one example, an anode stability additive is incorporated into the active material.

In one example, the anode stability additive includes a material selected from the group consisting of Co, Ba, and a combination thereof.

In one example, the electrode is configured as a cathode and wherein the active material includes a member selected from the group consisting of Ni, Ag, Li, Mg, and oxides and combinations thereof.

In one example, a cathode stability additive is incorporated into the active material.

In one example, the cathode stability additive includes a material selected from the group consisting of Cu, S, and a combination thereof.

In one example, the surface features include a member selected from the group consisting of pillars, tubes, trenches, cones, pyramids, pores, sponges, and combinations thereof.

In one example, an intermediate layer is disposed between the silicon substrate and the active material.

In one example, the intermediate layer includes a member selected from the group consisting of Cr, Ti, Au, Pt, and oxides and combinations thereof.

In one example, an electronic device substrate having a monolithically integrated ultrafast battery, can include a semiconductor substrate at least one electronic circuit element, and at least one ultrafast battery device of claim 1, wherein the at least one ultrafast battery device and the at least one electronic circuit element are formed monolithically on the semiconductor substrate.

In one example, the electronic circuit element includes an integrated circuit.

In one example, an ultrafast battery system having enhanced reliability can include a plurality of ultrafast battery devices as recited herein functionally coupled together in series or in parallel.

In one example, a method of increasing operation speed and reliability of a battery can include forming a structured surface on a silicon substrate of a first electrode, applying an active material to the structured surface, positioning a second electrode adjacent to the structured surface, and disposing an electrolyte between the second electrode and the active material.

In one example, a method of increasing operation speed and reliability of a battery can additionally include forming a second structured surface on the second electrode, applying a second active material to the second structured surface, and positioning the second structured surface adjacent to the structured surface of the first electrode.

In one example, the active material includes a member selected from the group consisting of Ni, Fe, Cd, Zn, Ag, Li, and oxides and combinations thereof.

In one example, the method may further include disposing a separator material between the first electrode and the second electrode.

In one example, forming the structured surface includes forming surface features having a morphology selected from the group consisting of pillars, tubes, trenches, cones, pyramids, pores, sponges, and combinations thereof.

In one example, applying the active material to the structured surface further includes applying an intermediate layer to the structured surface, and applying the active material to the intermediate layer, wherein the intermediate layer increases adhesion or electrical conductivity between the structured surface and the active material.

In one example, the intermediate layer includes a member selected from the group consisting of Cr, Ti, Au, Pt, and oxides and combinations thereof.

In one example, applying the active material to the structured includes applying a precursor material to the structured surface, and modifying at least a portion of the precursor material into the active material.

In one example, applying the active material to the structured surface further comprises depositing the active material on the structured surface.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An ultrafast battery device having enhanced reliability, comprising:
   a cathode including a first silicon substrate having a cathode structured surface;
   an anode including a second silicon substrate having an anode structured surface positioned adjacent to the cathode such that the cathode structured surface faces the anode structured surface; and
   an electrolyte disposed between the cathode and the anode, wherein the anode structured surface is coated with an anodic active material and the cathode structured surface is coated with a cathodic active material, and wherein the electrolyte includes a member selected from the group consisting of KOH, NaOH, and a combination thereof.

2. The device of claim 1, wherein the electrolyte further includes Li ions.

3. The device of claim 1, wherein the electrolyte further includes LiOH.

4. The device of claim 1, further comprising a separator disposed between the cathode and the anode to electronically separate the cathode from the anode and to allow ions of the electrolyte to pass therethrough.

5. The device of claim 1, wherein either of the anodic or the cathodic active material includes a member selected from the group consisting of Ni, Fe, Cd, Zn, Ag, Li, Mg, sulfides, oxides and combinations thereof.

6. The device of claim 1, wherein the anodic active material includes a member selected from the group consisting of Fe, Cd, Zn, and oxides and combinations thereof.

7. The device of claim 6, further comprising an anode stability additive incorporated into the anodic active material.

8. The device of claim 7, wherein the anode stability additive includes a material selected from the group consisting of Cu, S, and combinations thereof.

9. The device of claim 1, wherein the cathodic active material includes a member selected from the group consisting of Ni, Ag, Li, Mg, sulfides, oxides and combinations thereof.

10. The device of claim 9, further comprising a cathode stability additive incorporated into the cathodic active material.

11. The device of claim 10, wherein the cathode stability additive includes a material selected from the group consisting of Co, Ba, and combinations thereof.

12. The device of claim 1, wherein the anode structured surface increases surface area between the anodic active material and the electrolyte compared to an anode lacking a structured surface.

13. The device of claim 1, wherein the cathode structured surface increases surface area between the cathodic active material and the electrolyte compared to a cathode lacking a structured surface.

14. The device of claim 1, wherein at least one of the anode structured surface or the cathode structured surface has surface features with an average size ranging from about 10 nm to about 100 microns.

15. The device of claim 14, wherein the surface features include a member selected from the group consisting of pillars, tubes, trenches, cones, pyramids, walls, pores, sponges, wires and combinations thereof.

16. The device of claim 1, further comprising an intermediate layer disposed between at least one of the first silicon substrate and the anodic active material or the second silicon substrate and the cathodic active material.

17. The device of claim 16, wherein the intermediate layer includes a member selected from the group consisting of Cr, Ti, Au, Pt, and oxides and combinations thereof.

* * * * *